United States Patent [19]

Shrimpton et al.

[11] 4,318,875

[45] Mar. 9, 1982

[54] PROCESS FOR THE PRODUCTION OF CELLULAR ELASTOMERIC COMPOSITIONS AND COMPOSITIONS OBTAINED THEREBY

[75] Inventors: Ronald H. Shrimpton, Lichfield; Peter L. Cooney, Walmley, both of England

[73] Assignee: Dunlop Limited, London, England

[21] Appl. No.: 210,738

[22] Filed: Nov. 26, 1980

Related U.S. Application Data

[63] Continuation-in-part of Ser. No. 114,370, Jan. 22, 1980, abandoned.

[30] Foreign Application Priority Data

Feb. 17, 1979 [GB] United Kingdom ............... 05650/79

[51] Int. Cl.$^3$ ............................................... B29H 7/20
[52] U.S. Cl. ..................... 264/54; 260/724; 264/236; 264/328.2; 264/DIG. 5; 264/DIG. 18; 264/DIG. 83; 273/61 C; 273/76; 273/DIG. 22; 521/79; 521/93; 521/95; 521/96; 521/150; 525/5; 525/370; 525/386
[58] Field of Search ............... 525/5, 386, 370; 260/5; 521/79, 93, 96, 95, 150; 264/54, 236, 328.2, DIG. 5, DIG. 18, DIG. 83; 273/61 C

[56] References Cited

U.S. PATENT DOCUMENTS

| | | | |
|---|---|---|---|
| 3,965,055 | 6/1976 | Schiefman | 525/211 |
| 4,141,559 | 2/1979 | Melvin et al. | 273/220 |
| 4,169,599 | 10/1979 | Fujio et al. | 273/220 |
| 4,171,411 | 10/1979 | Ehrenfreund | 521/139 |
| 4,182,829 | 7/1978 | Watanabe et al. | 521/134 |
| 4,242,296 | 12/1980 | Bricker | 264/236 |

*Primary Examiner*—Morton Foelak
*Attorney, Agent, or Firm*—Stevens, Davis, Miller & Mosher

[57] ABSTRACT

A cross-linked, cellular elastomeric composition is made from a formulation which includes one or more natural and/or synthetic rubbers, a cross-linking agent, a monomeric metallic salt of an ethylenically-unsaturated carboxylic acid and a blowing agent. The metallic salt is preferably basic zinc methacrylate. The composition may be used to provide a core for a tennis-ball or a sponge for a table-tennis bat. The former use enables advantage to be taken of the properties hitherto only found in pressurized playballs, while the latter use leads to a marked increase in the speed of the ball when struck by the bat.

10 Claims, No Drawings

PROCESS FOR THE PRODUCTION OF CELLULAR ELASTOMERIC COMPOSITIONS AND COMPOSITIONS OBTAINED THEREBY

This application is a continuation-in-part of application Ser. No. 114,370, filed Jan. 22, 1980, and now abandoned.

This invention relates to a process for the production of cellular, elastomeric compositions and to the use of these compositions as components of items of sports equipment, in particular as components of playballs (especially tennis-balls) and as components of sports striking-implements (especially table-tennis bats).

More particularly, the present invention relates to a process for the production of a cross-linked, cellular, elastomeric composition from a formulation including a natural rubber and/or one or more synthetic rubbers, a cross-linking agent, a monomeric metallic salt and a blowing agent, and to the use of that composition in the production of a core for a tennis-ball and of a component of a table-tennis bat (hereinafter referred to as a "bat-sponge").

Currently-available tennis-balls are provided with hollow cores. These cores may either contain air at atmospheric pressure (in which case they are referred to as "pressureless cores") or they may contain air and/or an inert gas at a pressure of from 7 p.s.i. to 12 p.s.i. above atmospheric pressure (when they are referred to as "pressurised cores").

Authorities such as the International Tennis Federation (I.T.F.) lay down fairly stringent specifications for tennis-balls which are to be used in "officially-recognised" play; these specifications define the weight, size, compressibility and rebound properties of the balls. "Pressurised" balls, as currently available, generally satisfy the I.T.F. specifications, but suffer from certain disadvantages in manufacture. First, arrangements must be made to ensure that such balls will retain their internal pressure both in storage and in use. Second, if such balls become punctured, the internal pressure will be lost.

Whilst the currently-available "pressureless" balls do not, of course, suffer from the disadvantages mentioned in the immediately-preceding paragraph, they have serious deficiencies of their own. "Pressureless" balls tend to give a poor "response" off the racket when played, tend also to "collapse" at high impact-speeds, and tend to show poor "rebound" characteristics when covered with the "traditional" Melton cloth.

We have found that tennis-balls having cores of a cross-linked, cellular elastomer made according to the present invention approximate to the desirable playing properties of a "pressurised" ball, yet suffer from neither of the aforementioned disadvantages. For example, balls having cores according to the present invention can be punctured without affecting their playing properties.

We have also found that bat-sponges, made from cellular elastomers according to the present invention, provide novel playing characteristics, notably a substantial increase in the speed of a ball when played off the bat.

It is known to produce cellular elastomers from crosslinkable solid rubbers by means of a single-stage curing process in a closed mould. However, such a process leads to a residual internal pressure in the moulding, this pressure being slowly released when the mould is opened and the moulding removed. It can be several months before all the residual internal pressure has been released and during this period the moulding will shrink. Thus, either mouldings made in this way have to be stored until all residual internal pressure has been released (which is uneconomic) or such mouldings are totally unsuitable for use as ball-cores.

Furthermore, when it is desired to produce a bat-sponge (which is conventionally made by "slicing" layers of suitable thickness from a slab of foam), the same problems of release of residual pressure and unacceptability of physical properties would arise as described for ball-cores.

It is also known to produce cellular elastomeric materials from liquid precursors, e g polyurethanes. Now, for a cellular elastomeric material to possess the high level of resilience required for a ball-core or a bat-sponge, it is essential that the said material should have a substantially closed-cell structure. Such a structure would be difficult to achieve in a polyurethane foam and some shrinkage, together with lower than adequate resilience, would occur. Nor could liquid compounding ingredients such as reactive monomers be used in solid elastomer formulations since they would tend to reduce the viscosity of the formulation to an unacceptably low level.

Accordingly, the present invention provides a process for the production of a core for a tennis-ball or a batsponge for a table tennis bat, said core or sponge consisting of a cross-linked, cellular, elastomeric composition derived from a formulation including (i) at least one elastomeric material selected from the group consisting of natural rubber and synthetic rubbers, (ii) a cross-linking agent, (iii) at least one monomeric salt of an ethylenically-unsaturated carboxylic acid and (iv) a blowing agent, wherein said process includes the steps of (a) thoroughly mixing the said elastomeric material and the said monomeric salt without the application of heat thereto;

(b) transferring the mixture (a) to a cooled mixer and dispersing therein the said cross-linking agent and the said blowing agent;

(c) extruding the mixture (b) through a die and cutting the extrudate into slugs;

(d) moulding each slug in a pre-heated mould and maintaining the mould at the temperature of preheating until decomposition of the blowing agent occurs;

(e) transferring each moulding (d) to a second pre-heated mould and maintaining said second mould at the temperature of pre-heating until completion of the cross-linking occurs.

The present invention also provides components for items of sports equipment, the components being made from a cellular elastomeric composition as described in the immediately-preceding paragraph.

In the practice of the present invention, natural rubber, cis-polybutadiene rubber, styrene/butadiene rubber (SBR), nitrile rubber or a blend of any of these are preferred as the "fundamental" elastomer on which the formulation is built.

The cross-linking agent is preferably a peroxide, e.g. dicumyl peroxide.

The blowing agent may be any substance which will generate a non-toxic gas at the preferred reaction temperature. Thus "physical" types of blowing agent (such as low-boiling-point solvents and fluorocarbons) or "chemical" types of blowing agent (such as heat-sensitive materials in the form of fine powders or liquids which decompose at a particular temperature to yield a non-toxic gas) may be used. However, it is essential that the type and quality of blowing agent added must not significantly alter the viscosity of the formulation. For this reason a decomposable solid such as benzene sulphonhydrazide, sold by Fisons Limited as GENITRON BSH, is preferred. (GENITRON is a Registered Trade Mark).

The monomeric metallic salt may be zinc dimethacrylate, zinc diacrylate, a mixture of these two or basic zinc methacrylate (the reaction product formed by reacting zinc oxide with methacrylic acid in a 1/1 molar ratio). Basic zinc methacrylate is preferred as it gives better reproducibility. These salts are solids which do not exhibit true melting behaviour and their use avoids any undesirable change in viscosity of the formulation.

Other additives, well known to those skilled in the art, may be employed in making a composition according to the present invention. Such additives include the following:

(a) Fillers

Preferred fillers are carbon black (for tennis-ball cores) or titanium dioxide (for bat-sponges). In the case of a spherical moulding (as in ball-cores), carbon black also acts as an efficient heat-conductor during the moulding stages. In the production of bat sponges, a small amount of a pigment may be added to the formulation.

(b) Cross-linking rate controlling agents

Many substances which are known per se as antioxidants or antiozonants can be used to control the cure-rate of the reaction. For example N-1,3-dimethyl-butyl-N-phenyl-p-phenylene diamine, available from Vulnax International Limited as PERMANAX 6PPD. (PERMANAX is a Registered Trade Mark).

The presence of a cross-linking rate controlling agent confers some latitude on the moulding operation according to the present invention. In the absence of such materials, any deviation from the optimum cure-time for the formulation can result in an unacceptable product.

(c) Antioxidants

A preferred antioxidant is 2,2-methylene-bis(4-methyl-6-t-butyl phenol), available from Anchor Chemicals as Antioxidant 2246.

(d) Processing Aids

A preferred example of a processing aid is stearic acid. It is believed that stearic acid, in the formulation of the present invention, may improve the efficiency of the blowing agent.

The stage of mixing the elastomeric material and the monomeric metallic salt is carried out without the application of heat. This may, for example, be achieved by means of a cold Banbury or other internal mixer. The subsequent mixing stage (in which the cross-linking agent and the blowing agent are added to the formulation) is carried out in a cooled mixer (e g a water-cooled two-roll mill). This is done so as to avoid premature decomposition of the cross-linking agent and/or the blowing agent before the melting stage.

We have found that, for optimum results, the temperature of the formulation in the first and second mixing stages should be maintained at 70° C. or less.

We have also found that by extruding the mixture prior to moulding, air can substantially be eliminated from the formulation.

In order that optimum heat-transfer may take place between the heated mould and the extruded slug during the first moulding stage (d), we adjust the specific gravity of the formulation so that each slug substantially fills the mould cavity in which it is placed.

We have further found that it is necessary to control the reaction rate of the cross-linking agent so that blowing by the blowing agent can be completed before the cross-linking has advanced beyond the stage where the required degree of expansion of the moulding cannot occur when the first stage mould is opened. This is achieved according to the present invention by careful selection of both cross-linking and blowing agents, by accurate control of the first-stage moulding temperature and by addition of a cross-linking rate control agent.

The transfer of mouldings between the first and second moulding stages should be carried out as quickly as possible in order to minimise heat-loss from the partially-cured moulding. In the case of a ball-core, which is of spherical configuration and is already cellular after the first stage moulding operation, it is difficult to replace heat once this has been lost from the moulding and this difficulty in turn militates against a uniform rate of cure in the final moulding stages.

Thus, we have found that, provided that the said transfer between the two moulding stages can be carried out sufficiently quickly, the temperature of the first moulding stage can be 125° C. or less and that of the second moulding stage can be 160° C. or less.

Preferred embodiments of the present invention will be illustrated, merely by way of example, in the following description.

EXAMPLES I to III

Production of cellular tennis-ball cores according to the present invention was initially based on a black-filled cis-polybutadiene/basic zinc methacrylate compound. A typical example of such a compound is formulation I shown in Table A (below). The core produced from this formulation had certain properties that met the specification of a conventional tennis ball but other factors, such as higher resilience, adversely affected playing properties. Changes in the formulation and moulding conditions enabled a series of cores, with a range of hardness and resilience, to be produced and from these a softer core with considerably lower rebound was chosen for improved playing characteristics. An example of this is formulation II, where resilience has been lowered by blending cis-polybutadiene with SBR. Formulation III represents a still further development and leads to the production of a tennis-ball that has all the static properties of a conventional ball.

TABLE A

| Ingredient | | (Quantities are parts by weight) | | |
|---|---|---|---|---|
| | | Ex.I | Ex.II | Ex.III |
| (a) | Butadiene Rubber | 100 | 45 | — |
| (b) | Styrene/butadiene Rubber | — | 55 | 100 |
| (c) | Metallic salt | 20 | 12 | 15 |
| (d) | Cross-linking-rate control agent | 2 | 2 | 2 |
| (e) | Filler (i) | 30 | — | — |
| (e) | Filler (ii) | — | 35 | 35 |
| (f) | Antioxidant | 0.2 | 0.2 | 0.2 |
| (g) | Blowing agent | 3 | 2.5 | 2.5 |
| (h) | Cross-linking agent | 5 | 4 | 5 |

TABLE A-continued

| Ingredient | (Quantities are parts by weight) | | |
|---|---|---|---|
| | Ex.I | Ex.II | Ex.III |
| (j) Processing Aid | 0.2 | 0.2 | 0.2 |

Notes to TABLE A
(a) Butadiene rubber, available from Japan Synthetic Rubber Co. as JSR BRO 1
(b) Styrene-butadiene rubber, available from International Synthetic Rubber Co Ltd. as INTOL 1502.
(c) Basic zinc methacrylate.
(d) N-1,3-dimethyl-butyl-N-phenyl-P-phenylene diamine, available from Vulnax International Limited as PERMANAX 6PPD.
(e) (i) Carbon black type FT (Fine Thermal), available from Philblack as P33. (ii) Carbon black type MT (Medium Thermal), available from Sevalco as SEVACARB MT.
(f) 2,2-methylene-bis-(4-methyl-6-t-butyl phenol) available from Anchor Chemicals Limited as Antioxidant 2246.
(g) Benzene sulphonhydrazide, available from Fisons Limited as GENITRON BSH.
(h) Dicumyl peroxide, available from Hercules Powder Company Limited as DICUP 40KE.
(j) Stearic acid.
The words SEVACRRB, INTOL, PERMANAX, GENITRON and DICUP are Registered Trade Marks.

EXAMPLES I AND II

Referring to Formulations I and II in Table A (above), the compounding ingredients, except for the cross-linking agent and the blowing agent, were charged to a cold Banbury mixer and thoroughly mixed. The mixed compound was transferred to a water-cooled two-roll mill where the cross-linking and blowing agents were added and thoroughly dispersed. The compound was removed from the mill in strip form and the strips were fed to a cooled Barwell extruder. The extrudate was a 1.5 inch diameter rod which was then cut into slugs measuring approximately 2 inches long and weighing 46 g. The slugs were dusted with French chalk to prevent sticking in the mould.

Slugs were loaded into a multicavity mould which had been pre-heated to 125° C. between the platens of a press. The cavities were spherical in shape (with the mould closed) and were 1.73 inches in diameter. The mould was closed ad pressure applied to keep the mould closed during the foaming stage. After 19 minutes, blowing agent decomposition and partial cross-linking had occurred. On opening the mould the pressure produced inside the cores by the evolution of nitrogen caused them to expand in a uniform manner until this pressure reduced to atmospheric pressure i.e. there was no residual internal pressure inside the cores. The diameter of the cores at this stage was 2.56 inches. The cores were quickly transferred to a second mould of cavity diameter 2.56 inches this having been pre-heated to 160° C., and left for 20 minutes under very low pressure to complete the cross-linking reaction.

The cores were removed from the mould and allowed to cool when a small amount of shrinkage occurred. The following properties were recorded:

| | Example I | Example II |
|---|---|---|
| Weight(g) | 46 | 46 |
| Diameter (inches) | 2.42 | 2.42 |
| Forward compression (inches × $10^{-3}$) | 340 | 480 |
| Rebound from 100" (inches) | 73 | 65 |

The cores were covered with Melton cloth in the conventional manner and play-tested. Playing characteristics were found to be very good and were an improvement over those of conventional "pressureless" balls.

EXAMPLE III

Cores were produced from Formulation III in TABLE A (above) by the method given for Examples I and II. The following core properties were recorded:

| | |
|---|---|
| Weight(g) | 46 |
| Diameter (inches) | 2.42 |
| Forward compression (inches × $10^{-3}$) | 260 |
| Rebound from 100" (inches) | 61 |

The cores were covered with Melton cloth in the conventional manner and play-tested. The playing characteristics were again good but these balls travelled faster through the air than those of Example II and were consequently more difficult to control.

In general the playing qualities of balls made according to Example II are preferred but the expert player might use balls prepared according to Example III if he required a 'fast' game.

For comparative purposes the properties of currently available "pressureless" and "pressurised" cores are as follows:

| | Pressureless | Pressurised |
|---|---|---|
| Weight(g) | 46 | 46 |
| Diameter (inches) | 2.42 | 2.42 |
| Forward Compression (inches × $10^{-3}$) | 240 | 250 |
| Rebound from 100" (inches) | 62 | 70-72 |

EXAMPLE IV

This example describes the preparation of a table-tennis bat-sponge. The compound formulation was as shown in TABLE B(below).

TABLE B

| | Ingredient | Parts by weight |
|---|---|---|
| (a) | Butadiene Rubber | 100 |
| (b) | Pigment | 0.50 |
| (c) | Metallic Salt | 25 |
| (d) | Cross-linking-rate control agent | 1 |
| (e) | Blowing agent | 4 |
| (f) | Cross-linking agent | 5 |

Notes to TABLE B
(a) JSR BRO 1 (see notes to TABLE A)
(b) PV fast yellow/titanium dioxide (1:1 ratio)
(c) Basic zinc methacrylate
(d) Available from Uniroyal Inc. as NAUGARD 445
(e) GENITRON BSH (see notes to TABLE A)
(f) DICUP 40 KE (see notes to TABLE A)

The compound was prepared as described in Examples I to III (above), the blowing agent and peroxide being added on a mill.

The compound was removed from the mill as a sheet about ½ inch thick. A portion of this sheet, weighing 225 g, was loaded into a mould cavity measuring 5⅜ × 5⅜ × ½ inches, the mould having been pre-heated to 120° C. The volume of the material was such that it substantially filled the mould cavity in order to achieve the maximum rate of heat-transfer.

The mould was closed and pressure applied to keep it closed during the foaming stage. After 9 minutes the mould was opened and the fully expanded, partially cross-linked product was removed and transferred to a second mould cavity measuring 8¾ × 8¾ × ¾ inches, this mould having been pre-heated to 150° C. The mould was closed under minimal pressure and the cross-linking completed in 20 minutes.

The foamed slabs were removed from the mould and allowed to cool. The following properties were then recorded:

| Weight (g) | 225 |
| Specific gravity | 0.3 |
| Dimensions (inches) | 8½ × 8½ × ¾ |
| Pendulum block resilience | 96% |

The slabs of foam were sliced into thicknesses ranging from 1–2 mm. These were then cut to shape and applied to both faces of a table tennis bat. Pimpled rubber was then stuck to the foam layers and the finished bats play-tested.

The highly resilient foam produced, playing characteristics not previously encountered in the game of table tennis i.e. the speed of the ball off the bat was dramatically increased. This allows wider scope in selecting the optimum pimpled rubber facing and will improve the prospects of producing a range of bats for a variety of styles of play.

We claim:

1. A process for the production of a core for a tennis-ball or a bat sponge for a table-tennis bat, said core or sponge consisting of a cross-linked, cellular, elastomeric composition derived from a formulation including (i) at least one elastomeric material selected from the group consisting of natural rubber and synthetic rubbers, (ii) a cross-linking agent, (iii) at least one monomeric salt of an ethylenically-unsaturated carboxylic acid and (iv) a blowing agent, wherein said process includes the steps of (a) thoroughly mixing the said elastomeric material and the said salt without the application of heat thereto;
(b) transferring the mixture (a) to a cooled mixer and dispersing therein the said cross-linking agent and the said blowing agent;
(c) extruding the mixture (b) through a die and cutting the extrudate into slugs;
(d) moulding each slug in a pre-heated mould and maintaining the mould at the temperature of pre-heating until decomposition of the blowing agent occurs;
(e) transferring each moulding (d) to a second pre-heated mould and maintaining said second mould at the temperature of pre-heating until completion of the cross-linking occurs.

2. The process of claim 1, wherein the temperature of the mixing stage (a) is 70° C. or less.

3. The process of claim 1, wherein the temperature of the moulding state (d) is 125° C. or less.

4. The process of claim 1, wherein the temperature of the moulding stage (e) is 160° C. or less.

5. The process of claim 1, wherein said elastomeric material is a synthetic rubber selected from the group consisting of cis-polybutadiene rubbers, styrene/butadiene rubbers and nitrile rubbers.

6. The process of claim 1, wherein said cross-linking agent is dicumyl peroxide.

7. The process of claim 1, wherein said monomeric metallic salt is a salt selected from the group consisting of zinc dimethacrylate and zinc diacrylate.

8. The process of claim 1, wherein said monomeric metallic salt is the product obtained by reacting zinc oxide and methacrylic acid in a 1:1 molar ratio (basic zinc methacrylate).

9. The process of claim 1, wherein said blowing agent is a solid material which decomposes during formation of the composition to yield a non-toxic gas.

10. The process of claim 6, wherein said blowing agent is benzene sulphonhydrazide.

* * * * *